United States Patent
Goo et al.

(10) Patent No.: US 8,976,137 B2
(45) Date of Patent: Mar. 10, 2015

(54) DISPLAY DEVICE FOR TOUCH SENSING AND 3-DIMENSIONAL IMAGE DISPLAY, AND DRIVING METHOD THEREOF

(71) Applicant: Samsung Display Co., Ltd., Yongin (KR)

(72) Inventors: Nam-Hee Goo, Asan-si (KR); Ji Woong Kim, Suwon-si (KR); Chul Kim, Hwaseong-si (KR); Yu-Han Bae, Seoul (KR); Byoung Jun Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 185 days.

(21) Appl. No.: 13/684,868

(22) Filed: Nov. 26, 2012

(65) Prior Publication Data
US 2013/0300705 A1    Nov. 14, 2013

(30) Foreign Application Priority Data
May 9, 2012    (KR) .......................... 10-2012-0049316

(51) Int. Cl.
   G06F 3/044    (2006.01)
   G06F 3/041    (2006.01)
   G02F 1/1333   (2006.01)
   G02F 1/1347   (2006.01)
   G02B 27/22    (2006.01)

(52) U.S. Cl.
   CPC .............. *G06F 3/044* (2013.01); *G06F 3/0412* (2013.01); *G02F 1/13338* (2013.01); *G02F 1/13471* (2013.01); *G02B 27/22* (2013.01)

USPC .......................................... 345/173; 345/174

(58) Field of Classification Search
CPC ..... G06F 3/041; G06F 3/0412; G06F 3/0416; G06F 3/044
USPC ............. 345/173, 174, 419; 178/18.01, 18.03
See application file for complete search history.

(56) References Cited

U.S. PATENT DOCUMENTS

| | | | |
|---|---|---|---|
| 5,969,850 | A | 10/1999 | Harrold et al. |
| 7,292,229 | B2 | 11/2007 | Morag et al. |
| 7,663,607 | B2 | 2/2010 | Hotelling et al. |
| 7,787,064 | B2 | 8/2010 | Kwon et al. |
| 7,990,483 | B2 | 8/2011 | Park |
| 8,384,685 | B2 * | 2/2013 | Kuo et al. ...................... 345/173 |

(Continued)

FOREIGN PATENT DOCUMENTS

| | | |
|---|---|---|
| JP | 2011-053277 | 3/2011 |
| KR | 10-0824539 | 4/2008 |
| KR | 10-2008-0062523 | 7/2008 |

(Continued)

*Primary Examiner* — Regina Liang
(74) *Attorney, Agent, or Firm* — H.C. Park & Associates, PLC

(57) ABSTRACT

A touch barrier panel having a touch sensing capability and a 3-dimensional image display capability is disposed on a display panel such that manufacturing cost may be reduced and the thickness thereof is relatively thin. Also, the negative liquid crystal that is not affected by the vertical electric field is used such that a mode change speed and response speed may be improved.

20 Claims, 14 Drawing Sheets

(56) References Cited

U.S. PATENT DOCUMENTS

| | | |
|---|---|---|
| 2006/0087499 A1 | 4/2006 | Chen et al. |
| 2008/0143895 A1 | 6/2008 | Peterka et al. |
| 2010/0164901 A1 | 7/2010 | Chen et al. |
| 2011/0096251 A1 | 4/2011 | Son et al. |
| 2011/0109622 A1 | 5/2011 | Son et al. |
| 2011/0216039 A1* | 9/2011 | Chen et al. .................. 345/174 |
| 2011/0316846 A1 | 12/2011 | Su et al. |
| 2012/0242615 A1* | 9/2012 | Teraguchi et al. ............ 345/174 |

FOREIGN PATENT DOCUMENTS

| | | |
|---|---|---|
| KR | 10-0932298 | 12/2009 |
| KR | 10-2010-0000803 | 1/2010 |
| KR | 10-2011-0093508 | 8/2011 |
| KR | 10-1068880 | 9/2011 |
| KR | 10-1069130 | 9/2011 |
| KR | 10-2011-0113872 | 10/2011 |
| KR | 10-1076031 | 10/2011 |
| KR | 10-1094283 | 12/2011 |

* cited by examiner (A)

| Barrier | | Black | | White | | |
|---|---|---|---|---|---|---|
| 121-1 electrode | | 0V | | 0V | | 0V | |
| 121-2 electrode | 0V | | 3V | | 0V | | 3V |

DISPLAY DEVICE FOR TOUCH SENSING AND 3-DIMENSIONAL IMAGE DISPLAY, AND DRIVING METHOD THEREOF

CROSS-REFERENCE TO RELATED APPLICATION

This application claims priority from and the benefit of Korean Patent Application No. 10-2012-0049316, filed in the Korean Intellectual Property Office on May 9, 2012, which are incorporated herein by reference for all purposes as if fully set forth herein.

BACKGROUND OF THE INVENTION

1. Field of the Invention

Exemplary embodiments of the present invention relate to a display device for a touch sensing and 3-dimensional image display and a driving method thereof, and in particular, relates to a display device for a touch sensing and autostereoscopic 3-dimensional image display and a driving method thereof.

2. Discussion of the Background

These days, services to be implemented for high-speed transmission of information which are based on a high-speed information network are expected to be developed for multimedia services on the basis of digital terminals that process text, audio, and images at high speeds from services that are used to listen and speak such as a current phone service and ultimately developed to an ultra-space type of realistic 3-dimensional information and communication service which gives realistic feeling and is stereoscopically viewed, felt, and enjoyed beyond time and space.

In general, a 3-dimensional image which displays objects in three dimensions is realized by stereo vision through both eyes. Binocular disparity generated by a visual disparity between both eyes, i.e., a distance between both eyes of approximately 65 mm, may be an important factor of 3D viewing. That is, left and right eyes view different 2D images, and when both images are transferred to the brain through the retinas, the brain accurately fuses the images to reproduce a depth effect and a reality effect of the original 3D image. The ability is generally referred to as stereography.

The 3D image display device makes use of binocular disparity and includes a stereoscopic polarizing scheme and a time-division scheme, and an autostereoscopic parallax-barrier scheme, a lenticular scheme, and a blinking light scheme depending on whether or not an observer wears specialized glasses. Among them, to divide a left eye image and a right eye image of the autostereoscopic 3-dimensional image display device, an additional panel is required in addition to the display panel.

A contemporary display device often includes a touch sensing capability that allows touch sensing when a user touches a screen attached to the display device. As described above, the touch sensing display device has an advantage over other input devices since it allows a user to perform input without an additional input device. However, an additional touch sensing panel is needed in addition to the display panel.

Therefore, in order to implement touch sensing capability and display a 3-dimensional image, a panel for touch sensing and a panel for display for the 3-dimensional image are included, and thus, the manufacturing cost of the display device and the thickness thereof may be increased.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a display device and a driving method thereof having a touch sensing function and a 3-dimensional image display function while reducing manufacturing cost and thickness.

An exemplary embodiment of the present invention discloses a display device for touch sensing and 3-dimensional image display which includes: a display panel; a touch barrier panel disposed on the display panel, and including a liquid crystal layer, an upper electrode, a lower electrode, a first polarizer, and a second polarizer, the touch barrier panel being operable both in a touch sensing mode and a 3-dimensional image display mode; and a touch barrier panel controller, wherein the upper electrode and the lower electrode are extended in crossed directions with the liquid crystal layer interposed therebetween.

Another exemplary embodiment of the present invention discloses a method of driving a display device including a display panel and a touch barrier panel operable both in a touch sensing mode and a 3-dimensional image display mode, wherein the touch barrier panel comprises an upper electrode, a lower electrode, and a liquid crystal layer, the method including: determining whether the touch sensing mode is in an on state; and determining whether the 3-dimensional image display mode is in the on state; and operating the touch barrier panel in the touch sensing mode and the 3-dimensional image display mode by a time-division method when the two modes are in the on state.

As described above, one touch barrier panel having a touch sensing function and a 3-dimensional image display function is disposed on a display panel such that manufacturing cost may be reduced and the thickness thereof is relatively thin. Also, the liquid crystal arrangement that is not affected by the vertical electric field is applied such that display quality of the barrier panel (particularly the display quality of the 3-dimensional image) is not affected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9 and FIG. 10 are views showing a signal application relationship when a touch barrier panel of a display device according to an exemplary embodiment of the present invention operates to display a 3-dimensional image.

DETAILED DESCRIPTION OF THE ILLUSTRATED EMBODIMENTS

Figure 1:
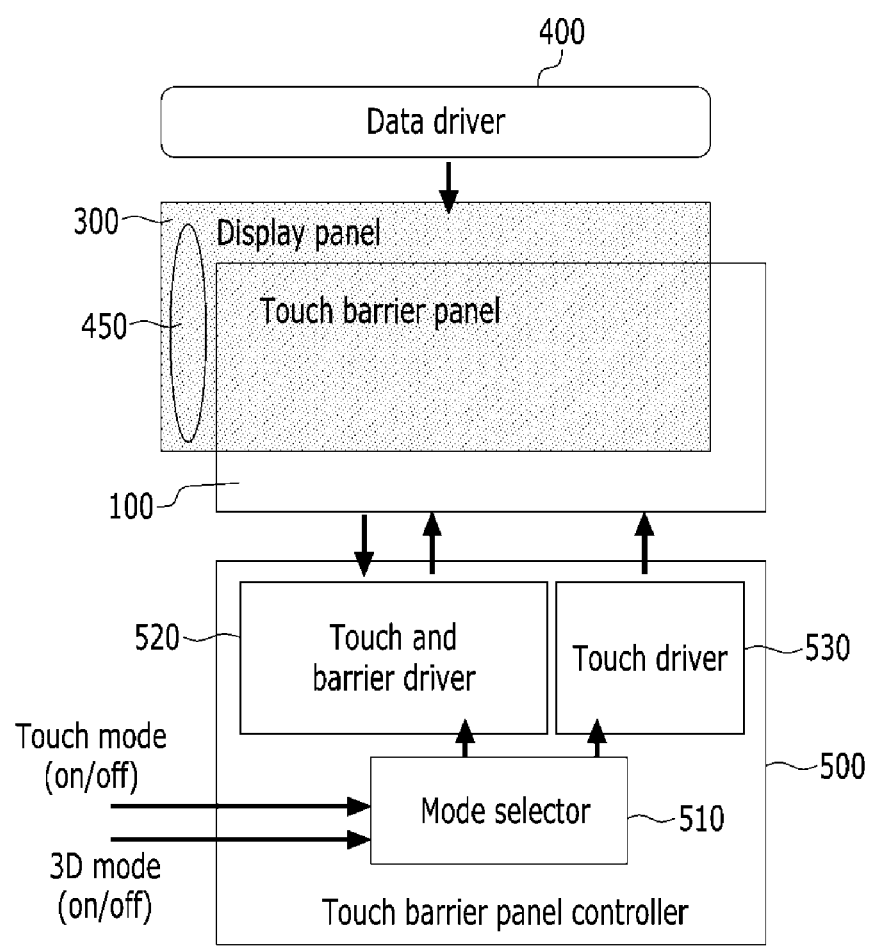
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that when an element such as a layer, film, region, or substrate is referred to as being "beneath" another element, it can be directly beneath the other element or intervening elements may also be present. In contrast, when an element is referred to as being "directly beneath" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be explained in detail with reference to the accompanying drawings.

A display device for touch sensing and 3-dimensional image display according to an exemplary embodiment of the present invention will be described with reference to FIG. 1 to FIG. 4.

Figure 2:
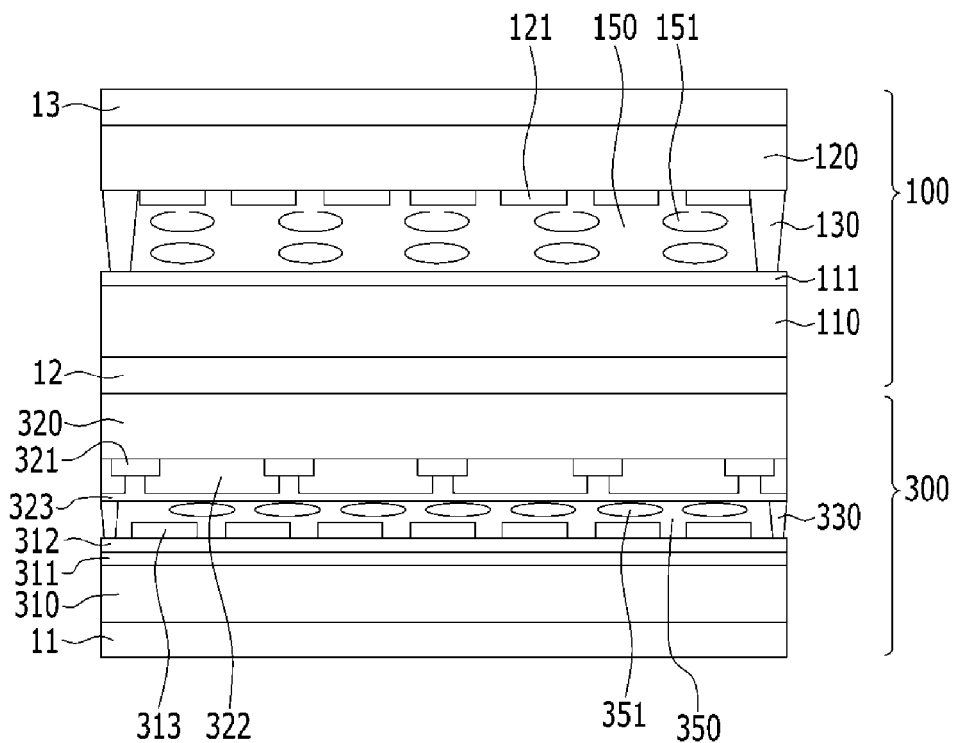
FIG. 2 is a cross-sectional view of a display device according to an exemplary embodiment of the present invention.
Figure 3:
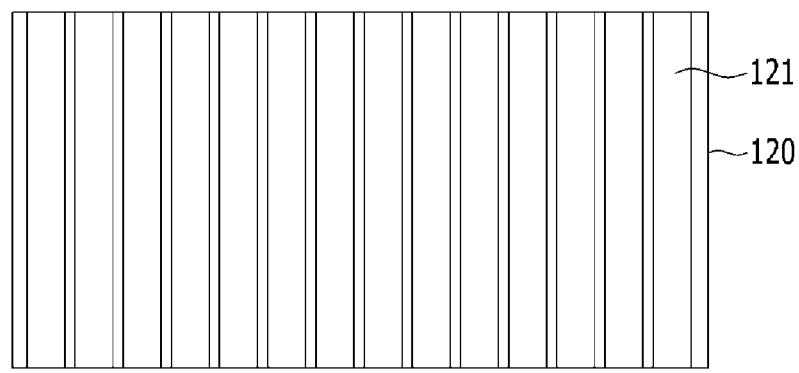
FIG. 3 and FIG. 4 are top plan views respectively showing an upper substrate and a lower substrate of a touch barrier panel according to an exemplary embodiment of the present invention.
Figure 4:
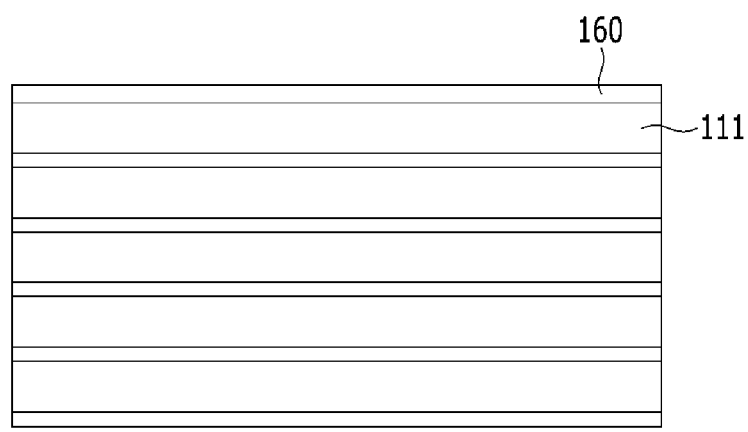

FIG. 1 is a block diagram of a display device according to an exemplary embodiment of the present invention, FIG. 2 is a cross-sectional view of a display device according to an exemplary embodiment of the present invention, and FIG. 3 and FIG. 4 are top plan views respectively showing an upper substrate and a lower substrate of a touch barrier panel according to an exemplary embodiment of the present invention.

A display device for touch sensing and 3-dimensional image display according to an exemplary embodiment of the present invention as a display device having both a touch sensing mode and a 3-dimensional image display mode includes a touch barrier panel 100 disposed at a front surface of a display panel 300.

Specifically, the display device for touch sensing and 3-dimensional image display may include the display panel 300, the touch barrier panel 100, and a touch barrier panel controller 500.

The touch barrier panel 100 will be described first. The touch barrier panel 100 as a panel having both the touch sensing and the 3-dimensional image display functions may include a liquid crystal layer 150, upper linear electrodes 121, and lower linear electrodes 111.

Referring to FIG. 2 to FIG. 4, for the touch barrier panel 100, the lower linear electrodes 111 are disposed on a lower substrate 110, and as shown in FIG. 4, linear electrodes 111 extending in a long axis direction (a horizontal direction) of the panel are arranged at predetermined intervals.

The upper linear electrodes 121 are disposed under an upper substrate 120 of the touch barrier panel 100, and as shown in FIG. 3, linear electrodes 121 extending in a short axis direction (a vertical direction) of the panel are arranged at predetermined intervals. As a result, the upper linear electrodes 121 and the lower linear electrodes 111 are crossed. While the electrodes 111 and 121 are described as linear electrodes, the shapes of the electrodes are not necessarily limited thereto. Therefore, various shapes of electrodes, such as zig-zag, may be used.

The liquid crystal layer 150 is disposed in a space between the upper substrate 120 and the lower substrate 110 defined by a first sealant 130. The liquid crystal layer 150 contains liquid crystal molecules that are not affected by a vertical electric field, but are affected by a horizontal electric field. This liquid crystal layer may include negative liquid crystal molecules that are horizontally arranged when an electric field is not applied or positive liquid crystal molecules that are vertically arranged when an electric field is not applied. That is, in the exemplary embodiment, the liquid crystal molecules that are not affected by the horizontal electric field generated by a touch or are slightly affected are employed, such that any liquid crystal molecule having little influence on the horizontal electric field may be employed, while not limited to the above two liquid crystal molecules. Hereafter, in an exemplary embodiment, negative liquid crystal molecules 151 that are horizontally arranged in the absence of an electric field will be described, and a characteristic of an exemplary embodiment using the negative liquid crystal molecules will be described with reference to FIG. 7 later.

Although not shown in FIG. 2, to initially align the liquid crystal molecules 151 of the liquid crystal layer 150, an alignment layer may be disposed between the upper linear electrodes 121 of the upper substrate 120 and the liquid crystal layer 150 and between the lower linear electrodes 111 of the lower substrate 110 and the liquid crystal layer 150.

Also, a first polarizer 13 is disposed on an upper surface of the upper substrate 120 and a second polarizer 12 is disposed on a lower surface of the lower substrate 110.

Light is blocked and transmitted by the first and second polarizers 13 and 12 and the liquid crystal layer 150 thereby functioning as a barrier panel used in a 3-dimensional image display. That is, light having a polarization component of a transmissive axis direction of the second polarizer 12 passes through the liquid crystal layer 150, and the polarization characteristic is changed according to the arrangement of the liquid crystal layer 150, which allows or disallows the light to pass the first polarizer 13 thereby performing a function as the barrier. That is, the electric field is disposed to the liquid crystal layer 150 by applying the voltage to the upper linear electrodes 121 or the lower linear electrodes 111 such that the arrangement of the liquid crystal molecules 151 is controlled based on the electric field. The touch barrier panel 100 according to an exemplary embodiment operates in a normally white mode such that the light reaching the second polarizer 12 is transmitted to the first polarizer 13 when the voltage is not applied to the upper and lower linear electrodes 121 and 111.

The touch barrier panel controller 500 controls the touch barrier panel 100 to perform the touch sensing or to display the 3-dimensional image, and for this purpose, includes a mode selector 510, a touch and barrier driver 520, and a touch driver 530 in an exemplary embodiment of the present invention. The mode selector 510 receives information on whether the display device performs only the touch sensing or only displays the 3-dimensional image, or performs both the touch sensing and the 3-dimensional image display, and thereby the touch and barrier driver 520 and the touch driver 530 are controlled.

The touch and barrier driver 520 is connected to the upper linear electrodes 121 of the touch barrier panel 100 to apply the voltage to the upper linear electrodes 121 or to read a voltage. That is, the touch and barrier driver 520 applies the voltage to the upper linear electrodes 121 when displaying a 3-dimensional image to form the barrier, and senses the voltage change in the upper linear electrodes 121 when sensing the touch to detect the touch existence.

The touch driver 530 is connected to the lower linear electrodes 111 of the touch barrier panel 100 to apply the voltage to the lower linear electrodes 111 or to float them. That is, by controlling the lower linear electrodes 111 through the touch driver 530 in an exemplary embodiment of the present invention, the lower linear electrodes 111 are floated when displaying a 3-dimensional image, and a predetermined voltage is applied when sensing the touch.

However, depending on embodiments, an application method of the voltage may be changed and the touch existence may be detected by sensing the change in the voltage by the driver 530 connected to the lower linear electrodes 111. However, the touch is generally made on the display device, and thus, the description will be made about an exemplary embodiment in which the driver (touch and barrier driver 520) connected to the upper linear electrodes 121 senses the voltage change.

An operation of the liquid crystal molecules and a voltage application of each driver for touch sensing or 3-dimensional image display on the touch barrier panel 100 will be described in detail with reference to FIG. 5 to FIG. 13.

The display panel 300 is disposed on a rear surface of the touch barrier panel 100. The display panel 300 may be various display panels such as an organic light emitting device, an electrophoretic display, an electro-wetting display device, and a plasma display device, and a liquid crystal display as the exemplary embodiment will be described in the present invention.

The display panel 300 according to the exemplary embodiment shown in FIG. 2 is a liquid crystal panel using a horizontal electric field.

A first electrode 311 of the display panel 300 is disposed on a lower substrate 310, an insulating layer 312 is disposed to cover the first electrode 311, and second electrodes 313 are disposed thereon. The second electrodes 313 may be linear electrodes extending in a short axis direction (the vertical direction) of the display panel in one pixel, and the first electrode 311 may be a plane electrode that is continuously disposed in at least one pixel.

Depending on embodiments, the first electrode 311 may be a plurality of linear electrodes, and in such case, the first electrodes 311 may be linear electrodes extending in the same direction as the second electrodes 313.

A light blocking member 321 having a plurality of openings is disposed under an upper substrate 320 of the display panel 300, a plurality of color filters 322 are disposed in the respective openings, and a planarization layer 323 is disposed to cover the light blocking member 321 and the color filters 322.

A liquid crystal layer 350 is disposed in a region defined by the upper substrate 320, the lower substrate 310, and a second sealant 330. In the present exemplary embodiment, the liquid crystal layer 350 may include liquid crystal molecules 351 that are horizontally arranged in the absence of an electric field. Also, the liquid crystal molecules 351 in the display panel 300 are the positive or negative liquid crystal molecules. However, the liquid crystal layer 350 of the display panel 300 may be vertically arranged or may be bent in the absence of an electric field, or various liquid crystal molecules may be used.

A third polarizer 11 is attached to the lower substrate 310. Due to the existence of the second polarizer 12 of the touch barrier panel 100 on the display panel 300, an additional polarizer is not presented. Depending on a point of view, the second polarizer 12 may be regarded as a component of the display panel 300.

The display panel 300 displays a gray according to a data voltage applied by the data driver 400. Also, the display panel 300 according to an exemplary embodiment includes a gate driver 450 disposed along with the wiring on the lower substrate 310, and thereby the data voltage is applied to a corresponding pixel based on an output of the gate driver 450.

Although not shown in the drawings, the liquid crystal panel 300 is a non-emissive device such that a backlight unit is needed. Therefore, a backlight unit is disposed on a rear surface of the display panel 300.

In the display device for touch sensing and 3-dimensional image display according to an exemplary embodiment, various modifications may be possible for the operation of the display panel 300, and the operation and the characteristics of the touch barrier panel 100 according to an exemplary embodiment will be described hereinafter.

The touch barrier panel 100 in the 3-dimensional image display mode and the touch sensing mode will be described with reference to FIG. 5 and FIG. 6.

Figure 5:
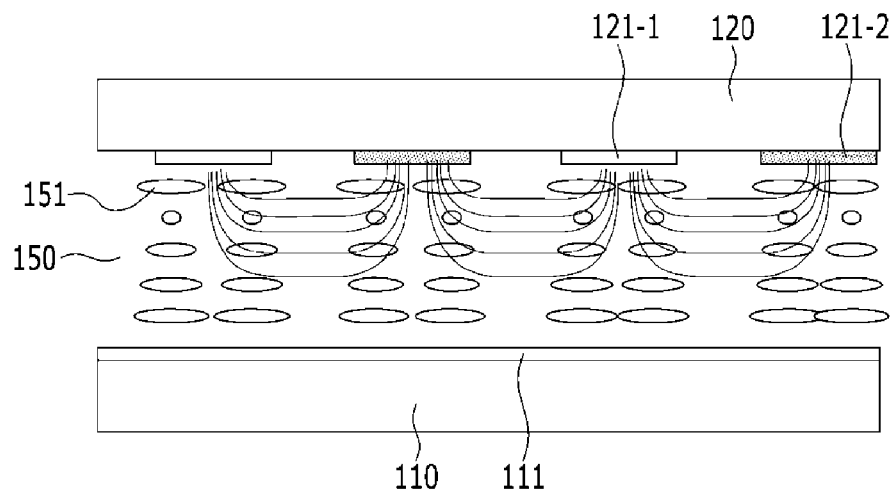
FIG. 5 is a cross-sectional view of a case that a touch barrier panel of a display device according to an exemplary embodiment of the present invention displays a 3-dimensional image.
Figure 6:
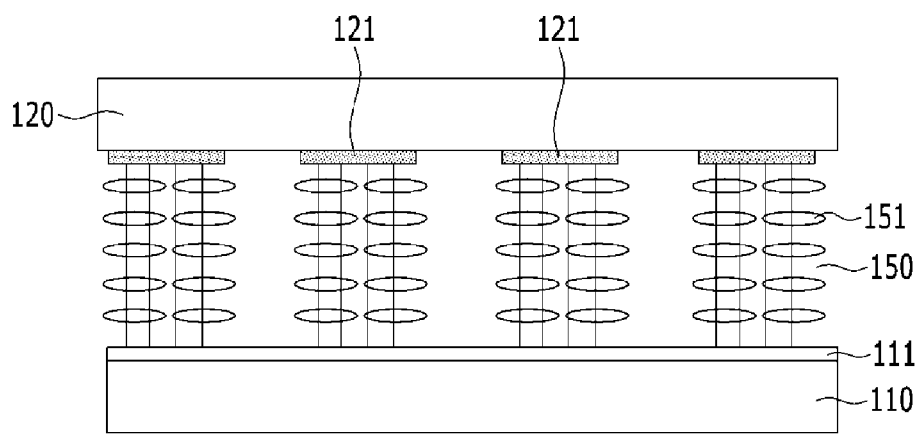
FIG. 6 is a cross-sectional view of a case that a touch barrier panel of a display device according to an exemplary embodiment of the present invention performs touch sensing.

FIG. 5 is a cross-sectional view of a touch barrier panel according to an exemplary embodiment of the present invention which displays a 3-dimensional image, and FIG. 6 is a cross-sectional view of a touch barrier panel according to an exemplary embodiment of the present invention which performs touch sensing.

FIG. 5 shows the cross-sectional view of the touch barrier panel 100 in the 3-dimensional image display mode.

In the 3-dimensional image display mode, the horizontal electric field is exerted to the liquid crystal layer 150 of the touch barrier panel 100 such that the lower linear electrodes 111 are floated and the electric field is not generated in the vertical direction. Also, in an exemplary embodiment of the present invention, since the touch barrier panel is not affected by the vertical electric field, it may be possible that the floating of the lower linear electrodes do not affect the overall operation. Also, the upper linear electrodes 121 are divided into electrodes 121-1 applied with a low voltage and electrodes 121-2 applied with a high voltage, and the voltage is applied to form the horizontal electric field such that the liquid crystal molecules 151 are rotated. As a result, the transmitted light may be blocked. Meanwhile, when adjacent upper linear electrodes 121 are applied with the same voltage as the low voltage or the high voltage, the horizontal electric field is not generated and the liquid crystal molecules 151 are not rotated. Therefore, the light is transmitted as it is. In consideration of these facts, if the upper linear electrodes 121 are applied with the voltage, a region where the light is transmitted and a region where the light is blocked are divided, thereby forming the barrier. The barrier thus formed divides a left eye image and a right eye image to display a 3-dimensional image. Depending on embodiments, a lenticular lens may be disposed thereon such that the left eye image and the right eye image are respectively refracted to be transmitted into a left eye and a right eye.

FIG. 6 shows the cross-sectional view of the touch barrier panel 100 in the touch sensing mode.

The touch sensing according to an exemplary embodiment is realized by sensing a change in the voltage generated by the touch through a liquid crystal capacitor formed by the liquid crystal layer 150 between the upper linear electrodes 121 and the lower linear electrodes 111 of the touch barrier panel 100. In the present exemplary embodiment, either the upper linear electrodes 121 or the lower linear electrodes 111 are applied with a constant voltage and the other electrodes sense the voltage change. For example, the lower linear electrodes 111 may be used as the electrodes applied with the voltage, and the upper linear electrodes 121 may be used as the electrodes sensing the voltage change. The touch is generated on the upper surface of the touch barrier panel 100, which facilitates easier sensing of the voltage change in the upper linear electrodes 121.

As described above, in the touch sensing mode, the vertical electrical field may be generated between the upper linear electrodes 121 and the lower linear electrodes 111. This electric field affects the liquid crystal layer 150 disposed in the touch barrier panel 100. In an exemplary embodiment of the present invention, the negative liquid crystal that is horizontally arranged when the electric field is not applied is used such that the horizontal arrangement is maintained although the electric field is applied in the vertical direction. That is, when using the positive liquid crystal that is horizontally arranged, the liquid crystal molecules 151 are changed to the vertical arrangement by the vertical electrical field such that the liquid crystal molecules may improperly operate or the response speed may be decreased in the 3-dimensional image display mode. Accordingly, in an exemplary embodiment of the present invention, the negative liquid crystal that is horizontally arranged when the electric field is not applied to the liquid crystal layer 150 of the touch barrier panel 100 is used. The positive liquid crystal that is vertically arranged when the electric field is not applied may be used depending on embodiments, and in such case, the positive liquid crystal that is vertically arranged when the vertical electric field is generated by the touch maintains the vertical arrangement such that the usage is possible.

Next, the liquid crystal operation in the touch barrier panel 100 of the present exemplary embodiment using the negative liquid crystal that is horizontally arranged when the electric field is not applied will be described with reference to FIG. 7.

Figure 7:
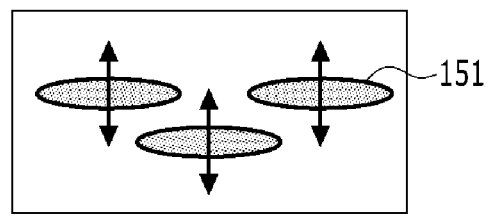
FIG. 7 is a view showing a characteristic of a liquid crystal molecule in a touch barrier panel of a display device according to an exemplary embodiment of the present invention.
Figure 7:
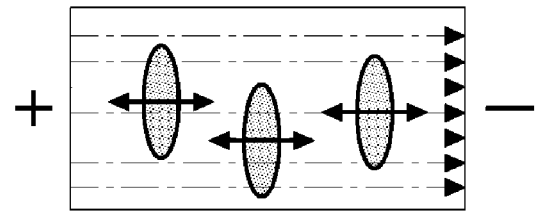
Figure 7:
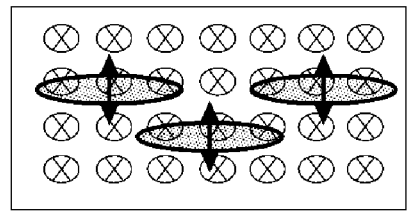

FIG. 7 is a view showing a characteristic of a liquid crystal molecule used in a touch barrier panel of a display device according to an exemplary embodiment of the present invention.

FIG. 7A shows the negative liquid crystal molecules 151, and the arrows indicate a direction along which a dielectric ratio is large. That is, when the electric field is applied, the negative liquid crystal molecules 151 are arranged such that the arrow direction (the short direction) is aligned in the electric field direction. This is shown in FIG. 7B.

Therefore, as shown in FIG. 7C, the negative liquid crystal molecules 151 may be rotated in the short axis direction although the electric field is applied in the vertical direction, however the long axis direction is not rotated such that the arrangement that may be directly used in the 3-dimensional image display mode is maintained. As a result, the operation characteristic of the touch barrier panel 100 and the response speed are improved and the operation characteristic that the touch barrier panel 100 is not affected by the vertical electric field is shown, thereby preventing the abnormal operation of the liquid crystal by the touch.

Next, a connection relationship of the touch barrier panel controller 500 and the touch barrier panel 100 will be described with reference to FIG. 8, and a control operation of the touch barrier panel controller 500 will be described with reference to FIG. 9 to FIG. 13.

Figure 8:
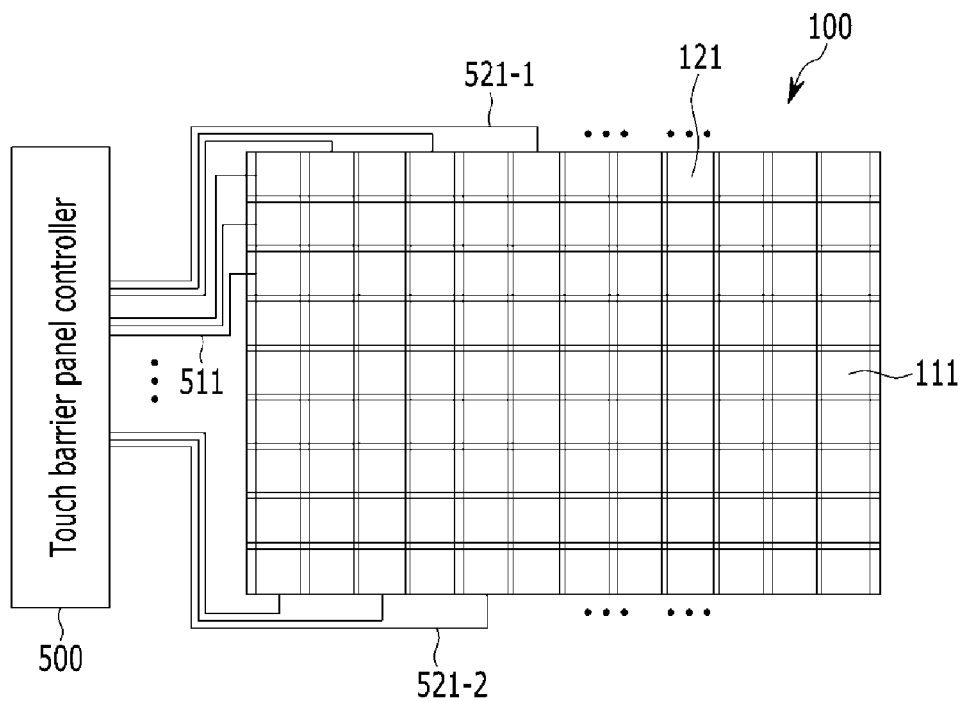
FIG. 8 is a view showing a wiring connection relationship of a display device according to an exemplary embodiment of the present invention.

FIG. 8 is a view showing a wiring connection relationship of a display device according to an exemplary embodiment of the present invention.

The touch barrier panel controller 500 has first wiring 511 which is connected to the lower linear electrodes 111, and second wiring 521 which is connected to the upper linear electrodes 121. The second wiring 521 in an exemplary embodiment of the present invention is divided into second -1 wiring 521-1 which is connected to the upper linear electrodes 121 at an upper direction of the touch barrier panel 100, and second -2 wiring 521-2 which is connected to the upper linear electrodes 121 at a lower direction of the touch barrier panel 100. The method of connecting the wiring in the upper direction and the lower direction is not absolutely necessary. The wiring may be divided with reference to the division of the upper linear electrodes 121-2 applying the high voltage and the upper linear electrodes 121-1 applying the low voltage. However, it is not limited thereto.

An operation according to the voltage application in an exemplary embodiment shown in FIG. 8 will be described with reference to FIG. 9 to FIG. 13.

Figure 9:
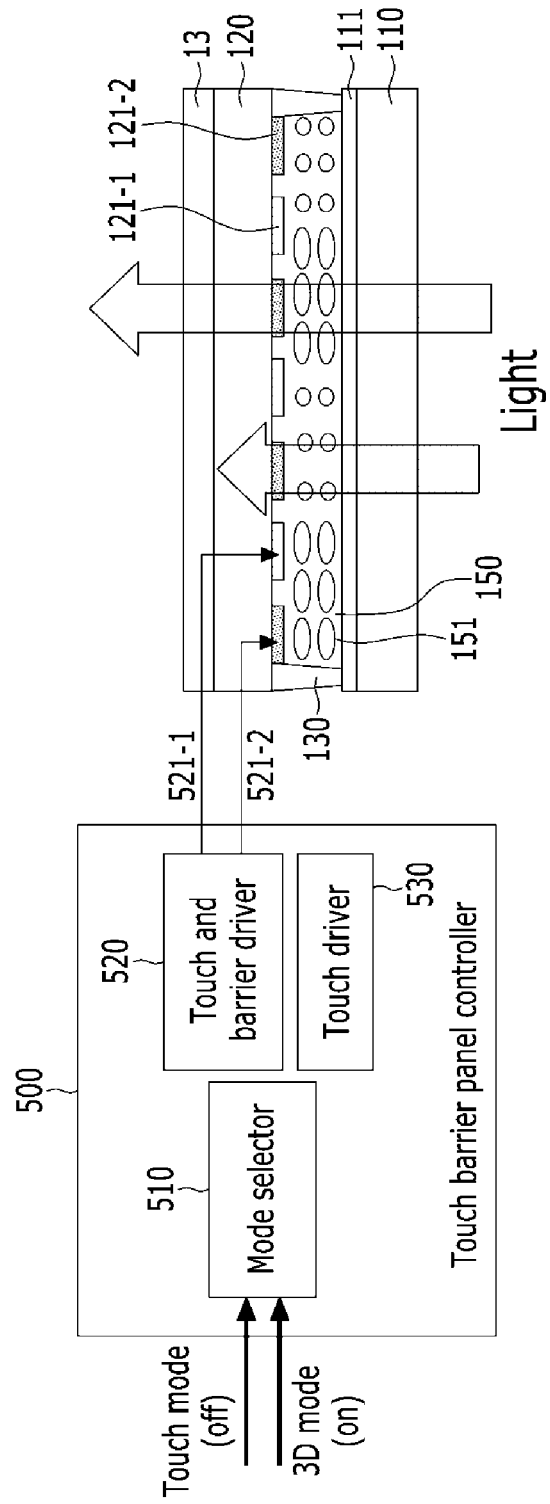

FIG. 9 and FIG. 10 are views showing a signal application relationship when a touch barrier panel of a display device according to an exemplary embodiment of the present invention operates to display a 3-dimensional image. That is, the 3-dimensional image display mode is on, and the touch sensing mode is off.

FIG. 9 shows a method of applying a voltage to the touch barrier panel 100 in the touch barrier panel controller 500. That is, the voltage is not applied to the lower linear electrodes 111 in the touch driver 530 such that the lower linear electrodes 111 are floated, and the touch and barrier driver 520 divides the upper linear electrodes 121 to apply the high voltage and the upper linear electrodes 121 to apply the low voltage and apply the corresponding voltage. In FIG. 9, the upper electrodes 121-1 and 121-2 among the upper linear electrodes 121 are not divided to be applied with the low voltage and the high voltage, but voltages are applied as shown in FIG. 10. That is, the upper linear electrodes 121-1 connected to the second -1 wiring 521-1 are applied with 0 V, 0 V, and 0 V from the left side, and the upper linear electrodes 121-2 connected to the second -2 wiring 521-2 are applied with 0 V, 3 V, 0 V, and 3 V from the left side. If these voltages are applied, like "Barrier" shown in FIG. 10, the barrier in which black and white are alternately shown is formed, thereby displaying a 3-dimensional image. That is, when the voltage difference between the adjacent upper linear electrodes 121 is generated, the light is blocked as black at the corresponding portion, and when the voltage difference between the adjacent upper linear electrodes 121 is not generated, the light is transmitted as white.

Figure 11:
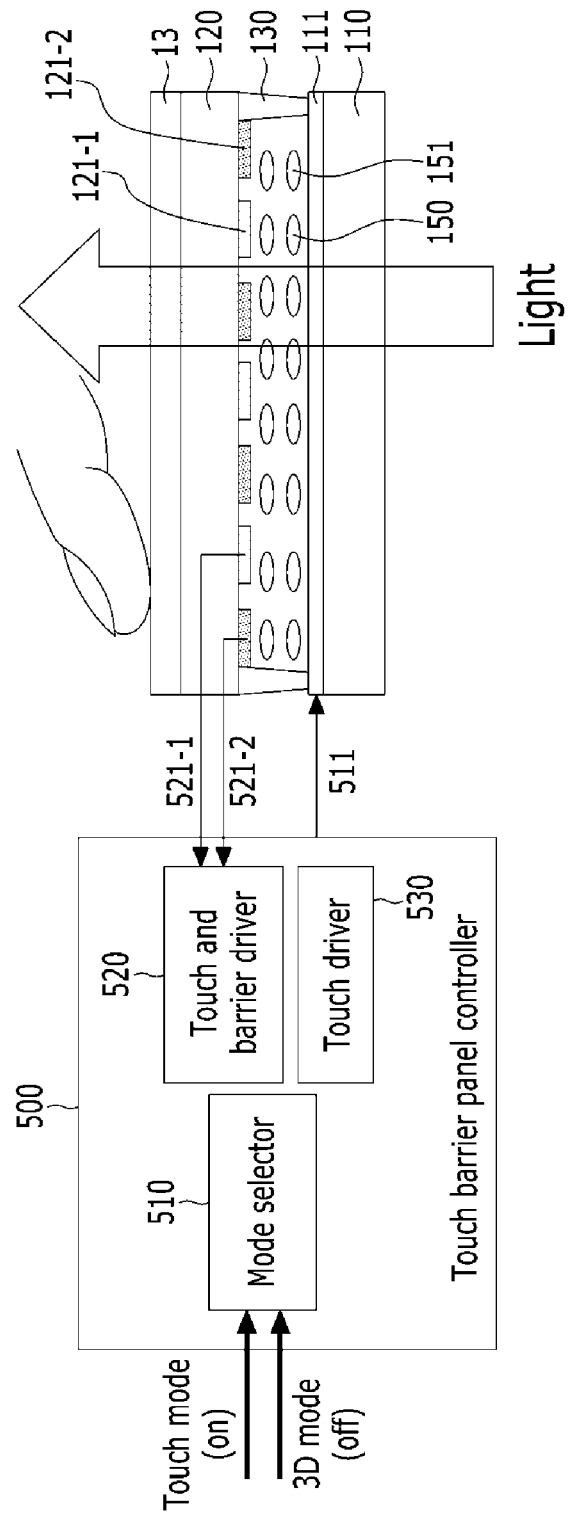
FIG. 11 is a view showing a signal application relationship when a touch barrier panel of a display device according to an exemplary embodiment of the present invention operates for touch sensing.

FIG. 11 is a view showing a signal application relationship when a touch barrier panel of a display device according to an exemplary embodiment operates for touch sensing. That is, the 3-dimensional image display mode is off, and the touch sensing mode is on.

FIG. 11 shows a method of applying the voltage to the touch barrier panel 100 in the touch barrier panel controller 500. That is, the voltage is applied to the lower linear electrodes 111 in the touch driver 530, and at this time, the touch and barrier driver 520 detects the touch by sensing the voltage change in the upper linear electrodes 121. The voltage of the upper linear electrodes 121 is determined according to the voltage applied to the lower linear electrodes 111, and the touch is detected by sensing the voltage that is different from the predetermined voltage. Particularly, the method in which the touch driver 530 applies the voltage to the lower linear electrodes 111 may apply the same voltage to the entire lower linear electrodes 111 one time, sequentially apply the voltage for each group after several lower linear electrodes 111 are grouped, and sequentially apply the voltage to each of the lower linear electrodes 111. By sequentially applying the voltage, multiple touches may be sensed.

Figure 12:
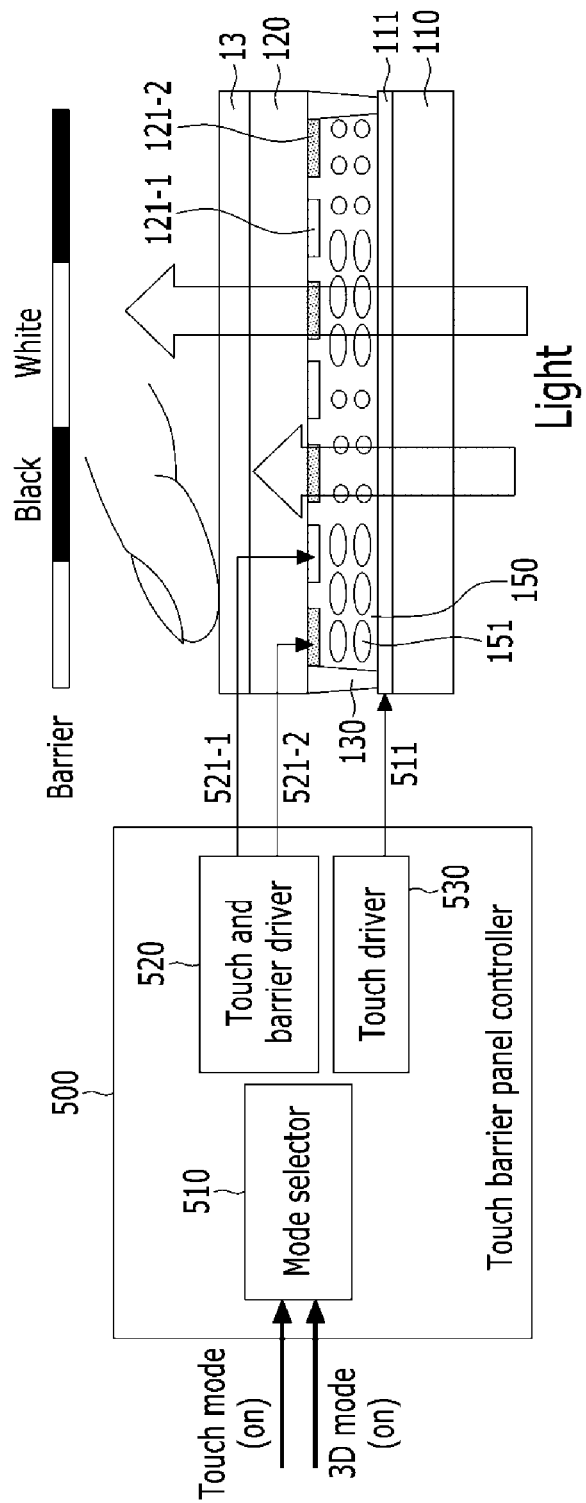
FIG. 12 and FIG. 13 are views of a signal application and a timing diagram when a touch barrier panel of a display device according to an exemplary embodiment of the present invention operates to display touch sensing and a 3-dimensional image together.
Figure 13:
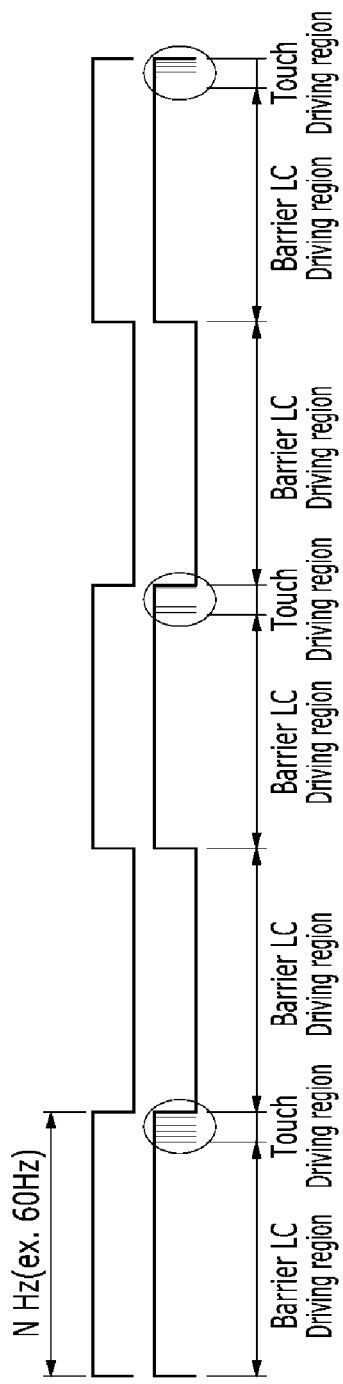

FIG. 12 and FIG. 13 are views of signal application and a timing diagram when a touch barrier panel of a display device according to an exemplary embodiment operates to display touch sensing and a 3-dimensional image together. That is, the 3-dimensional image display mode and the touch sensing mode are both on.

In an exemplary embodiment of the present invention, when the 3-dimensional image display mode and the touch sensing mode are both on, two modes operate in a time-divisional manner as shown in FIG. 13.

FIG. 12 includes all the characteristics of FIG. 8, and FIG. 11 shows forming the barrier for the display of the 3-dimensional image and sensing the touch.

FIG. 13 shows the time-division driving, and a quadrangle waveform shown in the upper part of FIG. 13 is an operation frequency of the display panel 300, and a quadrangle waveform shown in the lower part is the operation frequency of the touch barrier panel 100.

As shown in FIG. 13, for example, in case the display panel 300 operates at 60 Hz, the touch barrier panel 100 performs the touch sensing operation during a part of one period and the 3-dimensional image display operation is performed during a remaining part. In general, it is enough to perform the touch sensing at a high frequency (KHz), and thus, it may be enough to perform the touch sensing operation per several 1H (horizontal synchronization periods) as shown in FIG. 13.

Also, the touch sensing operation may be performed in a blank period or in a display period in which the display panel 300 performs the display operation.

As a result, a user may see the 3-dimensional image and may simultaneously provide a desired input signal through the touch.

Hereinafter, the operation of the touch barrier panel controller will be described with reference to FIG. 14.

Figure 14:
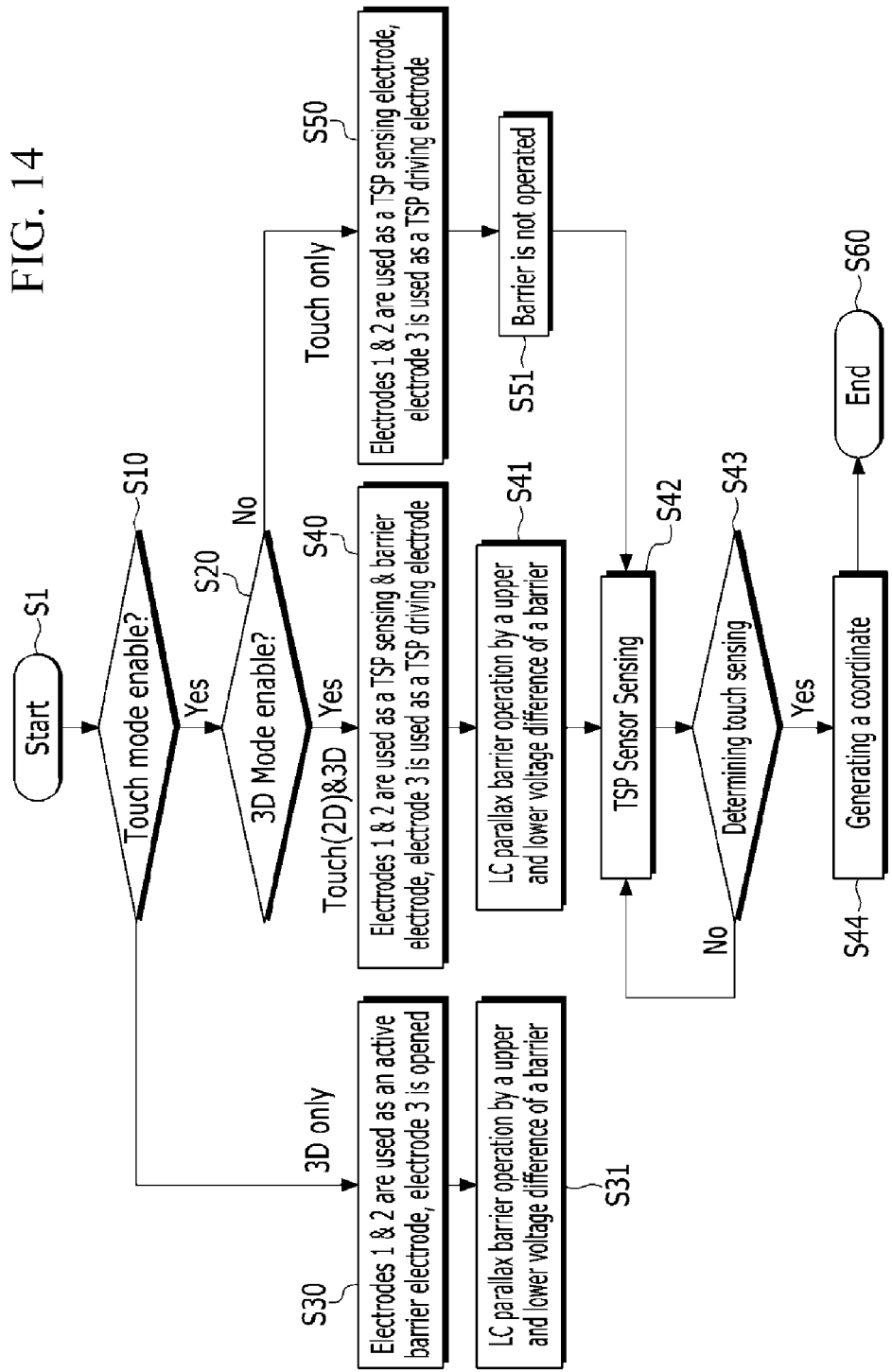
FIG. 14 is a flowchart of a driving sequence for touch sensing and 3-dimensional image display by a display device according to an exemplary embodiment of the present invention.

FIG. 14 is a flowchart of a driving sequence for a touch sensing and a 3-dimensional image display by a display device according to an exemplary embodiment of the present invention. In FIG. 14, enable means that a corresponding mode is in an on state, electrode 1 and 2 means the upper linear electrodes, and electrode 3 means the lower linear electrode.

If power is applied to the touch barrier panel controller 500 to operate it (S1), it is firstly detected that the touch mode is in the on state (S10).

If the touch mode is in the off state, the 3-dimensional image display mode is performed such that the voltage is applied to the upper linear electrodes (electrodes 1 and 2) to form the barrier and the lower linear electrode (electrode 3) is opened to be floated (S30). Next, a barrier operates according to the voltage applied to the upper linear electrodes (electrodes 1 and 2) such that the 3-dimensional image display is possible (S31).

When the touch mode is in the on state, it may be additionally detected whether the 3-dimensional image display mode is in the on state (S20). When the 3-dimensional image mode is in the off state, only the touch mode operates such that the lower linear electrode (electrode 3) is used as the electrode which is applied with the driving voltage and the upper linear electrodes (electrodes 1 and 2) are used as the electrodes for sensing the voltage (S50), but not operate as the barrier (S51).

The driving voltage is applied to the lower linear electrode (electrode 3) and the upper linear electrodes (electrode 1 and 2) sense the voltage (S42), and the touch is determined with reference to the voltage sensed from the upper linear electrodes (electrode 1 and 2). When the touch is sensed (S43), a touch coordinate is generated (S44) and the operation ends (S60).

When the touch mode is in the on state and the 3-dimensional image display mode is in the on state, the barrier operates along with the touch mode (S40) that the lower linear electrode (electrode 3) is used as the electrode applied with the driving voltage and the upper linear electrodes (electrode 1 and 2) are used as the electrodes for sensing the voltage such that the 3-dimensional image is displayed (S41).

In the touch mode, the lower linear electrode (electrode 3) is applied with the driving voltage and the upper linear electrodes (electrode 1 and 2) sense the voltage (S42), and the touch is determined based on the voltage sensed from the upper linear electrodes (electrode 1 and 2). When the touch is sensed (S43), the touched coordinate is generated (S44) and the operation ends (S60).

For these cases, as shown in FIG. 13, the operation of the touch mode and the 3-dimensional image display operation are separated in time from each other.

Next, another exemplary embodiment of the present invention will be described.

Figure 15:
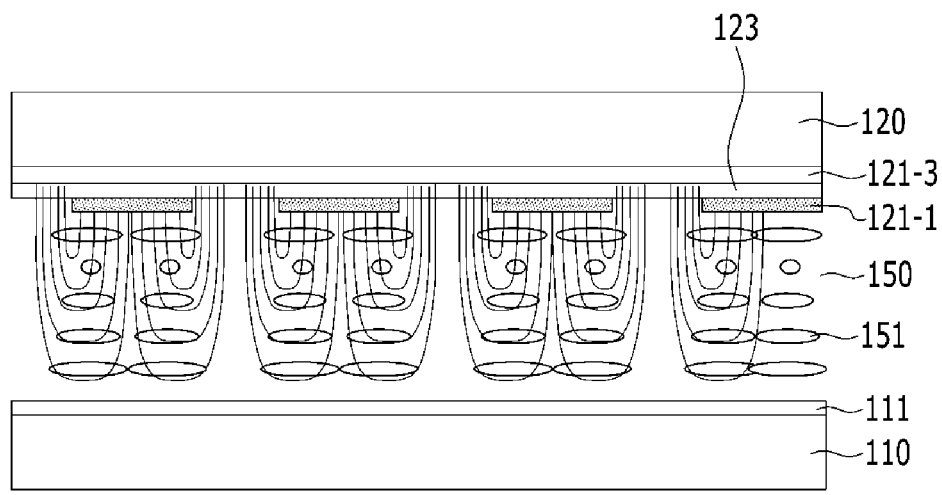
FIG. 15 and FIG. 16 are cross-sectional views showing a display device which displays a 3-dimensional image and senses a touch according to another exemplary embodiment of the present invention.
Figure 16:
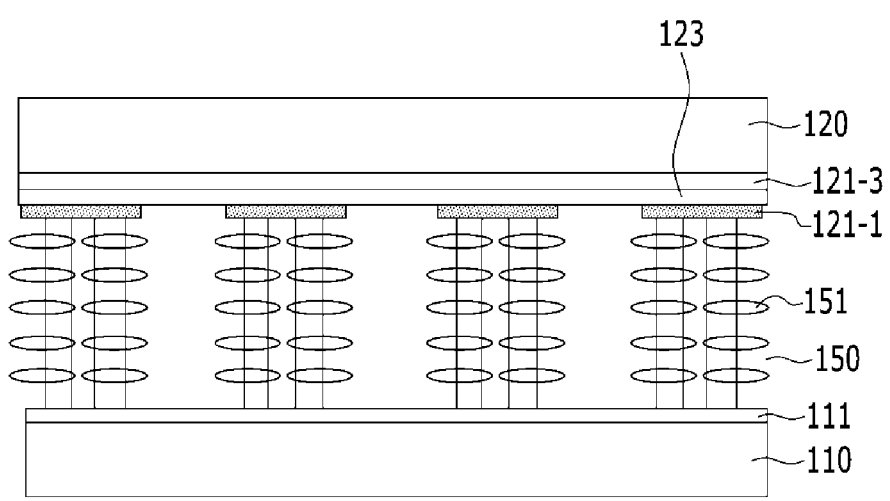

FIG. 15 and FIG. 16 show an exemplary embodiment in which an electrode structure of the touch barrier panel 100 is changed.

FIG. 15 and FIG. 16 are cross-sectional views showing a display device which displays a 3-dimensional image and senses a touch according to another exemplary embodiment of the present invention.

The touch barrier panel 100 according to the exemplary embodiment of FIG. 15 and FIG. 16 will be described. The touch barrier panel 100 includes a liquid crystal layer 150, two upper electrodes 121, and lower linear electrodes 111.

For the touch barrier panel 100, the lower linear electrodes 111 are disposed on the lower substrate 110, and as shown in FIG. 4, the lower linear electrodes 111 extending in the long axis direction (the horizontal direction) of the panel are arranged at predetermined intervals.

Two upper electrodes 121 are disposed under the upper substrate 120 of the touch barrier panel 100. An upper plane electrode 121-3 having a plane structure and covering the entire region where the light is transmitted in the upper substrate 120 is disposed under the upper substrate 120. An upper insulating layer 123 covering the upper plane electrode 121-3 is disposed under the upper plane electrode. The upper linear electrodes 121-1 are disposed under the upper insulating layer 123, and as shown in FIG. 3, the upper linear electrodes 121-1 extending in the short axis direction (the vertical direction) of the panel are arranged at predetermined intervals. As a result, the upper linear electrodes 121-1 and the lower linear electrodes 111 are arranged to be crossed.

The liquid crystal layer 150 is disposed between the upper substrate 120 and the lower substrate 110, and includes the negative liquid crystal molecules 151 that are horizontally arranged when the electric field is not applied. On the other hand, depending on embodiments, positive liquid crystal molecules that are vertically arranged when the electric field is not applied may be used. The liquid crystal molecules are affected by the vertical electric field such that the quality of the display image is not deteriorated.

Although not shown in the drawings, to initially align the liquid crystal molecules 151 of the liquid crystal layer 150, the alignment layer may be disposed between the upper linear electrodes 121 of the upper substrate 120 and the liquid crystal layer 150 and between the lower linear electrodes 111 of the lower substrate 110 and the liquid crystal layer 150.

Although not shown in FIG. 15 and FIG. 16, as shown in FIG. 2, the second polarizer 12 and the first polarizer 13 are attached outside the touch barrier panel 100.

FIG. 15 shows the cross-sectional view of the touch barrier panel 100 for the 3-dimensional image display mode, wherein the lower linear electrodes 111 are not applied with the voltage to be floated, and the upper linear electrodes 121-1 and the upper plane electrodes 121-3 form the electric field such that the liquid crystal molecules 151 of the liquid crystal layer 150 are rotated. A portion of the upper linear electrodes 121-1 have a different voltage from the upper plane electrode 121-3 to form the electric field, and the remaining portion has the same voltage as the upper plane electrode 121-3 not to form the electric field such that regions where the light is transmitted and regions where the light is not transmitted are formed. In the present exemplary embodiment, the touch barrier panel 100 operates in the normally white mode, thereby having the characteristic that the light is transmitted when the electric field is not formed.

FIG. 16 shows the cross-sectional view of the touch barrier panel 100 operating in the touch mode.

In the touch mode, a liquid crystal capacitor is disposed between the lower linear electrodes 111 and the upper linear electrodes 121-1 and a constant voltage is applied to the upper linear electrodes 121-1 according to the voltage applied to the lower linear electrodes 111. If the touch is generated, the corresponding voltage is changed such that the touch existence is determined. The touch existence is determined by sensing the voltage change in the upper linear electrodes 121-1.

In the present exemplary embodiment, the upper plane electrode 121-3 is also disposed such that the touch existence may be detected through a voltage change of the upper plane electrode 121-3.

Figure 17:
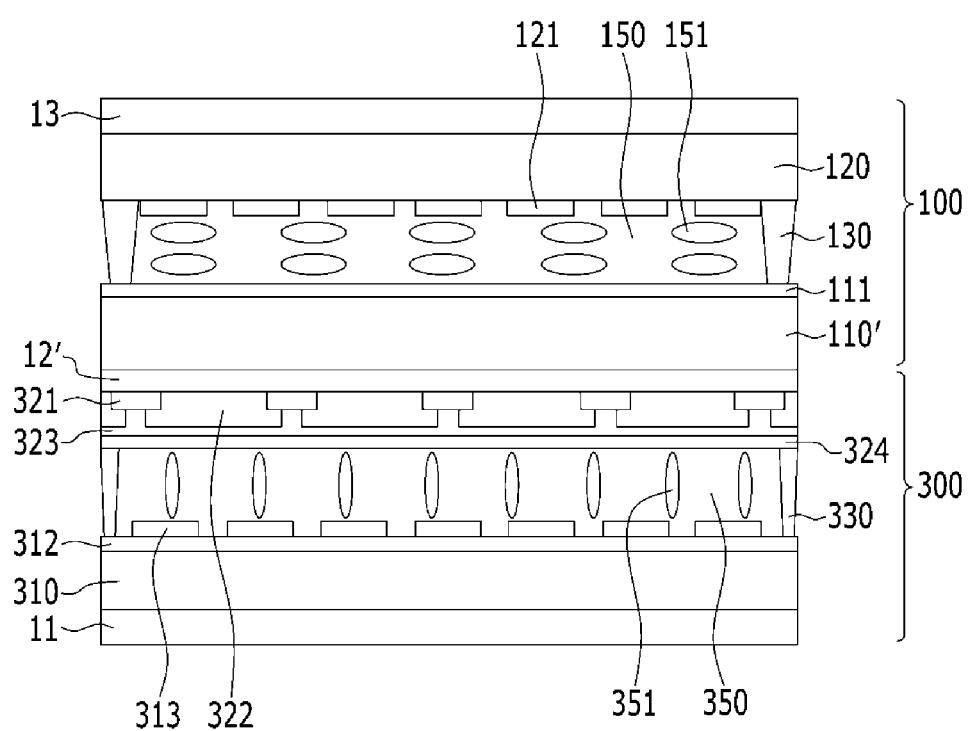
FIG. 17 is a cross-sectional view of a display device according to another exemplary embodiment of the present invention.

FIG. 17 is a cross-sectional view of a display device according to another exemplary embodiment of the present invention.

In the exemplary embodiment of FIG. 17, a substrate 110' is disposed between the touch barrier panel 100 and the display panel 300, instead of forming two substrates 110 and 320, and the second polarizer 12 is replaced with an inner polarizer 12' disposed inside the substrate.

The exemplary embodiment of FIG. 17 reduces the thickness by one substrate, and the inner polarizer 12' that is thinner than a typical polarizer of a film type is deposited and disposed such that the display device with a further thin thickness may be formed.

The inner polarizer 12' includes metal wiring (not shown) of aluminum formed with an interval of less than 100 nm, thereby having a characteristic of polarizing light. The inner polarizer 12' may reduce the thickness of the polarizer by about 5-10 μm. The inner polarizer 12' is not limited to the exemplary embodiment, and includes all polarizers disposed at one side of the substrate through a deposition process and a developing process, but is not attached as the film type.

Also, in FIG. 17, the liquid crystal layer 350 used in the display panel 300 is a liquid crystal layer that is vertically aligned, and the common electrode 324 is disposed at the upper side and the pixel electrodes 313 are disposed at the lower side.

The structure of FIG. 17 will now be described in detail.

The display device for touch sensing and 3-dimensional image display according to an exemplary embodiment of the present invention includes the display panel 300 and the touch barrier panel 100.

Firstly, the touch barrier panel 100 will be described. The touch barrier panel 100 is a panel having the functions of touch sensing and 3-dimensional image display, and includes a liquid crystal layer 150, upper linear electrodes 121, and lower linear electrodes 111.

In the touch barrier panel 100, the lower linear electrodes 111 are disposed on the lower substrate 110', and the lower linear electrodes 111 extending in the long axis direction (the horizontal direction) of the panel are arranged at predetermined intervals as shown in FIG. 4.

On the other hand, upper linear electrodes 121 are disposed under the upper substrate 120 of the touch barrier panel 100, and the upper linear electrodes 121 extending in the short axis direction (the vertical direction) of the panel are arranged at predetermined intervals. As a result, the upper linear electrodes 121 and the lower linear electrodes 111 are crossed.

In the touch barrier panel 100, the lower linear electrodes 111 are disposed on the lower substrate 110', and the lower linear electrodes 111 extending in the long axis direction (the horizontal direction) of the panel as shown in FIG. 4 are arranged at predetermined intervals.

The liquid crystal layer 150 is disposed in the region defined by the first sealant 130. The liquid crystal layer 150 includes the negative liquid crystal molecules 151 that are horizontally arranged when the electric field is not applied, and according to another exemplary embodiment, the positive liquid crystal molecules that are vertically arranged when the electric field is not applied may be used.

Although not shown in FIG. 17, to initially arrange the liquid crystal molecules 151 of the liquid crystal layer 150, the alignment layer may be further disposed between the upper linear electrodes 121 of the upper substrate 120 and the liquid crystal layer 150, and between the lower linear electrodes 111 of the lower substrate 110' and the liquid crystal layer 150.

Also, the first polarizer 13 is disposed on the upper surface of the upper substrate 120, and the inner polarizer 12' is disposed on the lower surface of the lower substrate 110'.

A light blocking member 321 having openings is disposed under the inner polarizer 12', color filters 322 are disposed in the respective openings, and a planarization 323 covering is disposed to cover the light blocking member 321 and the color filter 322. The common electrode 324 is disposed under the planarization layer 232.

An insulating layer 312 is disposed on the lower substrate 310 of the display panel 300, and the second electrodes (313; referred to as pixel electrodes) are disposed thereon. Each of the second electrodes 313 has a structure covering a predetermined region in one pixel, and forms the electric field along with an overlying common electrode 324.

The liquid crystal layer 350 is disposed in the region defined by the second sealant 330 between the lower substrate 110' of the touch barrier panel 100 and the lower substrate 310 of the display panel 300. The liquid crystal layer 350 includes the liquid crystal molecules 351 that are vertically arranged when the electric field is not applied. The liquid crystal molecules 351 used in the display panel 300 may be arranged vertically or horizontally when the electric field is not applied, and may use the negative or the positive liquid crystal molecules or various liquid crystal molecules.

The third polarizer 11 is attached to the lower substrate 310.

In the exemplary embodiment of FIG. 17, the display panel 300 rotates the liquid crystal molecules 351 by using the vertical electric field. Therefore, the present exemplary embodiment is different from the case where the liquid crystal molecules 351 are rotated by using the horizontal electric field as shown in FIG. 2. However, according to an exemplary embodiment of the present invention, the display panel 300 may be various display panels as well as the liquid crystal panel.

Also, in the above exemplary embodiment, the touch may be realized by sensing the voltage change generated by the touch in the capacitor disposed by the liquid crystal layer 150 disposed between the upper linear electrodes 121 and the lower linear electrodes 111 of the touch barrier panel 100, however the present invention is not limited thereto, and the touch may be sensed by the contact of the upper electrode and the lower electrode or a blocking of light incident from the outside, and an additional pen such as a stylus may be applied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel;
a touch barrier panel disposed on the display panel, and comprising a plurality of upper electrodes, a plurality of lower electrodes, a liquid crystal layer disposed between the upper electrodes and the lower electrodes, a first polarizer, and a second polarizer, the touch barrier panel being operable both in a touch sensing mode and a 3-dimensional image display mode; and
a touch barrier panel controller,
wherein the plurality of upper electrodes are arranged in a first direction, and the plurality of lower electrodes are arranged in a second direction crossing the first direction, the plurality of upper electrodes are extended to cross the plurality of lower electrodes with the liquid crystal layer interposed therebetween,
wherein the touch barrier panel controller is configured to apply voltages to the upper electrodes to operate in the 3-dimensional image display mode, and
wherein the touch barrier panel controller is configured to apply voltages to one of the upper electrodes and the lower electrodes and detects a change in voltages of the other one of the upper electrodes and the lower electrodes to operate in the touch sensing mode.

2. The display device of claim 1,
the liquid crystal layer comprises negative liquid crystal molecules that are horizontally arranged in the absence of an electric field.

3. The display device of claim 2, wherein
the touch barrier panel is a normally white mode panel.

4. The display device of claim 3, wherein
in the touch sensing mode, the touch barrier panel controller is configured to sense a touch based on a change of a voltage of a liquid crystal capacitor formed by the lower electrode, the liquid crystal layer, and the upper electrode.

5. The display device of claim 4, wherein
the touch barrier panel controller is configured to sense the touch by sensing a change of a voltage exerted at the upper electrode according to the voltage applied to the lower electrode.

6. The display device of claim 3, further comprising another upper electrode,
wherein, in the 3-dimensional image display mode, the touch barrier panel controller is configured to apply a high voltage to the upper electrode and a lower voltage to the another upper electrode.

7. The display device of claim 6, wherein
the lower electrode is floated.

8. The display device of claim 6, wherein
light is transmitted in a portion where adjacent upper electrodes are applied with the same voltage, and light is blocked in a portion where adjacent upper electrodes are applied with different voltages.

9. The display device of claim 3, wherein
the touch barrier panel controller drives the touch panel in the touch sensing mode and the 3-dimensional image display mode in a time divisional manner.

10. The display device of claim 9, wherein
the touch sensing mode is performed in a blank period.

11. The display device of claim 3, wherein
the touch barrier panel further comprises an upper plane electrode.

12. The display device of claim 3, wherein
the display panel is a liquid crystal panel, and
the display panel and the touch barrier panel share a second polarizer.

13. The display device of claim 12, wherein
the upper substrate of the display panel and the lower substrate of the touch barrier panel are the same unit.

14. The display device of claim 13, wherein
the second polarizer is disposed as an inner polarizer.

15. The display device of claim 1, wherein
the liquid crystal layer comprises positive liquid crystal molecules that are vertically arranged in the absence of an electric field.

16. A method of driving a display device comprising a display panel and a touch barrier panel operable both in a touch sensing mode and a 3-dimensional image display mode, wherein the touch barrier panel comprises a plurality of upper electrodes arranged in a first direction, a plurality of lower electrodes arranged in a second direction crossing the first direction, and a liquid crystal layer disposed between the upper electrodes and the lower electrodes, the method comprising:

determining whether the touch sensing mode is in an on state;

determining whether the 3-dimensional image display mode is in the on state;

operating the touch barrier panel in the touch sensing mode by applying voltages to one of the upper electrodes and the lower electrodes and detecting a change in voltages of the other one of the upper electrodes and the lower electrodes; and operating the touch barrier panel in the 3-dimensional image display mode by applying voltages to the upper electrodes.

17. The driving method of claim 16, wherein
the touch sensing mode is performed in a blank period.

18. The method of claim 16, wherein
when the touch sensing mode is in the on state, the touch barrier panel senses the touch based on a change of a voltage of a liquid crystal capacitor formed by the lower electrode, the liquid crystal layer, and the upper electrode.

19. The method of claim 16, wherein
when the 3-dimensional image mode is in the on state, a high voltage is applied to the upper electrode, and a low voltage is applied to another upper electrode.

20. The method of claim 19, wherein
when the 3-dimensional image mode is in the on state, the lower electrode is floated.

* * * * *